US012572464B2

(12) United States Patent
Gupta et al.

(10) Patent No.: US 12,572,464 B2
(45) Date of Patent: Mar. 10, 2026

(54) VEHICLE NON-VOLATILE MEMORY INITIZATION CONTROL STRATEGY

(71) Applicant: FCA US LLC, Auburn Hills, MI (US)

(72) Inventors: Kushagra Gupta, Auburn Hills, MI (US); Gnanesh Baggu, Ottawa (CA)

(73) Assignee: FCA US LLC, Auburn Hills, MI (US)

( * ) Notice: Subject to any disclaimer, the term of this patent is extended or adjusted under 35 U.S.C. 154(b) by 99 days.

(21) Appl. No.: 18/739,515

(22) Filed: Jun. 11, 2024

(65) Prior Publication Data

US 2025/0378021 A1     Dec. 11, 2025

(51) Int. Cl.
*G06F 12/02*     (2006.01)
*B60L 58/10*     (2019.01)
*G07C 5/08*      (2006.01)

(52) U.S. Cl.
CPC .......... *G06F 12/0246* (2013.01); *B60L 58/10* (2019.02); *G07C 5/085* (2013.01)

(58) Field of Classification Search
CPC ...... G06F 12/0246; B60L 58/10; G07C 5/085
See application file for complete search history.

(56) References Cited

U.S. PATENT DOCUMENTS

| | | | | |
|---|---|---|---|---|
| 6,226,575 B1 * | 5/2001 | Lu | .......................... | G08G 1/042 |
| | | | | 340/455 |
| 2005/0013154 A1 * | 1/2005 | Honda | ................ | G06F 12/0246 |
| | | | | 711/E12.008 |

| | | | | |
|---|---|---|---|---|
| 2008/0238192 A1 * | 10/2008 | Hashimoto | ............... | H02J 1/14 |
| | | | | 307/10.1 |
| 2015/0052397 A1 * | 2/2015 | Nakamura | .............. | G06F 3/065 |
| | | | | 714/22 |
| 2022/0212545 A1 * | 7/2022 | Araujo Xavier | ........ | B60L 50/60 |
| 2023/0153029 A1 * | 5/2023 | Park | ...................... | G06F 3/0616 |
| | | | | 711/154 |
| 2023/0208327 A1 * | 6/2023 | Chen | ..................... | B60L 3/0046 |
| | | | | 318/400.01 |

FOREIGN PATENT DOCUMENTS

| | | |
|---|---|---|
| CN | 103914393 A | 7/2014 |
| CN | 111858172 A | 10/2020 |
| CN | 112506712 A | 3/2021 |
| KR | 101629184 B1 | 6/2016 |

* cited by examiner

*Primary Examiner* — Tasnima Matin
(74) *Attorney, Agent, or Firm* — Jeremy J. Klobucar

(57)     ABSTRACT

A non-volatile memory (NVM) initialization control method for an electrified vehicle includes providing an NVM configured to store data relating to operation of the electrified vehicle including information relating to a high voltage battery system of the electrified vehicle, detecting a wake-up event of the electrified vehicle and, in response, executing a base software (BSW) that reads the data from the NVM and writes the data to a random-access memory (RAM) mirror, reading the data from the RAM mirror only once and maintain a separate copy of the read data from the NVM for usage by periodic processes during operation of the electrified vehicle, determining whether the wake-up event is a valid wake-up event and, when invalid, executing application software (ASW) configured to write the read data to the RAM mirror instead of default values.

16 Claims, 2 Drawing Sheets

—200

VEHICLE NON-VOLATILE MEMORY INITIZATION CONTROL STRATEGY

FIELD

The present application generally relates to electrified vehicles and, more particularly, to a non-volatile memory (NVM) initialization control strategy for electrified vehicles.

BACKGROUND

Electrified vehicles having high voltage battery systems must be able to periodically disconnect and electrically isolate the high voltage battery system for safety reasons. This is typically achieved by opening a high voltage contactor and discharging a corresponding high voltage bus. A control system of the electrified vehicle typically stores data relating to the high voltage battery system in a non-volatile memory (NVM) at an end of each vehicle power cycle. Additionally, there are events where a normal shutdown does not occur, such as a 12V power loss due to a crash event. To cover for such events when a normal shutdown does not occur, critical data is written instantaneously to the NVM as it is updated/changed. However, in these scenarios, upon a subsequent vehicle power cycle, default values could override or overwrite the previous values (in a random-access memory, or RAM mirror) at the time of the shutdown/crash event. This could result in false setting of diagnostics and improper vehicle functions, which could lead to customer dissatisfaction. Accordingly, while such NVM initialization control techniques do work for their intended purpose, there exists an opportunity for improvement in the relevant art.

SUMMARY

According to one example aspect of the invention, a non-volatile memory (NVM) initialization control system for an electrified vehicle is presented. In one exemplary implementation, the NVM initialization control system comprises an NVM configured to store data relating to operation of the electrified vehicle including information relating to a high voltage battery system of the electrified vehicle and a controller configured to detect a wake-up event of the electrified vehicle, in response to detecting the wake-up event, execute a base software (BSW) that reads the data from the NVM and writes the data to a random-access memory (RAM) mirror, read the data from the RAM mirror only once and maintain a separate copy of the read data from the NVM for usage by periodic processes during operation of the electrified vehicle, determine whether the wake-up event is a valid wake-up event, wherein the valid wake-up event is a power-up of the electrified vehicle that follows a scheduled power-down of the electrified vehicle, and in response to determining that the wake-up event is an invalid wake-up event, execute application software (ASW) configured to write the read data to the RAM mirror instead of default values.

In some implementations, the controller is a battery pack control module (BPCM). In some implementations, the RAM mirror is an internal buffer of the controller that is used for read and write operations to the NVM and the separate copy of the read data is stored in a separate RAM block of the controller.

In some implementations, the invalid wake-up event is a power-up event of the electrified vehicle that follows an unscheduled power-down of the electrified vehicle. In some implementations, the unscheduled power-down is a 12 volt power loss of the electrified vehicle. In some implementations, the 12 volt power loss of the electrified vehicle is a result of a crash event of the electrified vehicle.

In some implementations, the NVM is an electrically-erasable programmable read-only memory (EEPROM). In some implementations, the maintaining of the separate copy of the read data from the NVM for usage by periodic processes during operation of the electrified vehicle and the execution of the ASW configured to write the read data to the RAM mirror instead of default values in response to detecting the invalid wakeup event avoids at least one of (i) false setting of vehicle diagnostics and (ii) improper vehicle functions.

According to another example aspect of the invention, an NVM initialization control method for an electrified vehicle is presented. In one exemplary implementation, the NVM initialization control method comprises providing an NVM configured to store data relating to operation of the electrified vehicle including information relating to a high voltage battery system of the electrified vehicle, detecting, by a controller, a wake-up event of the electrified vehicle, in response to detecting the wake-up event, executing, by the controller, a BSW that reads the data from the NVM and writes the data to a RAM mirror, reading, by the controller, the data from the RAM mirror only once and maintain a separate copy of the read data from the NVM for usage by periodic processes during operation of the electrified vehicle, determining, by the controller, whether the wake-up event is a valid wake-up event, wherein the valid wake-up event is a power-up of the electrified vehicle that follows a scheduled power-down of the electrified vehicle, and in response to determining that the wake-up event is an invalid wake-up event, executing, by the controller, ASW configured to write the read data to the RAM mirror instead of default values.

In some implementations, the controller is a BPCM. In some implementations, the RAM mirror is an internal buffer of the controller that is used for read and write operations to the NVM and the separate copy of the read data is stored in a separate RAM block of the controller.

In some implementations, the invalid wake-up event is a power-up event of the electrified vehicle that follows an unscheduled power-down of the electrified vehicle. In some implementations, the unscheduled power-down is a 12 volt power loss of the electrified vehicle. In some implementations, the 12 volt power loss of the electrified vehicle is a result of a crash event of the electrified vehicle.

In some implementations, the NVM is an EEPROM. In some implementations, the maintaining of the separate copy of the read data from the NVM for usage by periodic processes during operation of the electrified vehicle and the execution of the ASW configured to write the read data to the RAM mirror instead of default values in response to detecting the invalid wakeup event avoids at least one of (i) false setting of vehicle diagnostics and (ii) improper vehicle functions.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, a control system of an electrified vehicle typically stores data relating to a high voltage battery system in a non-volatile memory (NVM), such as electrically-erasable programmable read-only memory (EE-PROM), at an end of each vehicle power cycle. However, there are events where a normal shutdown does not occur, such as a 12V power loss due to a crash event. In these scenarios, upon a subsequent vehicle power cycle, default values could override or overwrite the previous values (in a random-access memory, or RAM mirror) at the time of the shutdown/crash event. This could result in false setting of diagnostics and improper vehicle functions, which could lead to customer dissatisfaction.

More specifically, application software (ASW) interfaces for immediate write (per the AUTomotive Open System Architecture, or AUTOSAR® standard) writes default values to the RAM mirror. This could result in false setting of diagnostics and improper vehicle functions, which could lead to customer dissatisfaction.

Accordingly, improved vehicle NVM initialization control techniques are presented herein. These techniques determine whether a wake-up condition is valid before initiating a write operation to the NVM. This is achievable via ASW rather than base software (BSW) because controller BSW is vendor-specific and there could be different/inconsistent behavior across various applications. For each wake-up event, data is only read from the RAM mirror once and is maintained in a separate RAM space (separate RAM variables). In addition, if a wake-up event is determined to be invalid, the ASW will write the previously-read value to the RAM mirror instead of default values, thereby avoiding any unintended data changes. Potential benefits include avoiding false vehicle diagnostics (e.g., false positive malfunctions) and improper vehicle functions and, as a result, improved customer satisfaction.

Figure 1:
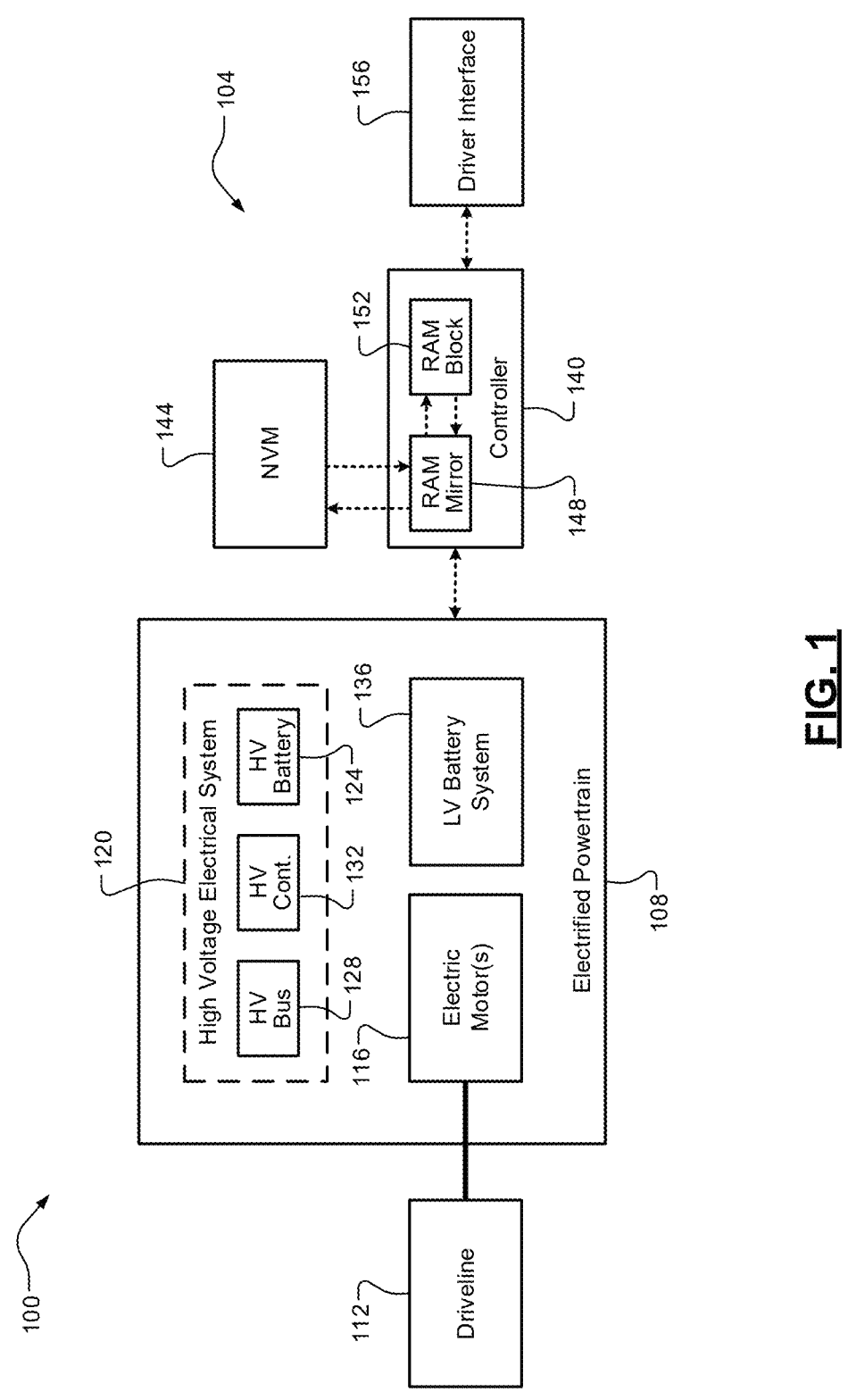
FIG. 1 is a functional block diagram of an electrified vehicle having an example non-volatile memory (NVM) initialization control system according to the principles of the present application.

Referring now to FIG. 1, a functional block diagram of an electrified vehicle 100 having an example NVM initialization control system 104 according to the principles of the present application is illustrated. While the present application is specifically focused on electrified vehicles having high voltage battery systems, it will be appreciated that these NVM initialization control systems could also be applicable to other types of vehicles (hybrid vehicles, conventional internal combustion engine, or ICE-only vehicles, etc.). The NVM initialization control techniques of the present application are uniquely important for electrified vehicle applications having high voltage battery systems. In one example, an improver NVM initialization after a crash event of an electrified vehicle could potentially result in a safety hazard (shock, fire, etc.) if default values inadvertently overwrite the previously-stored NVM values and the high voltage battery system were previously disconnected and electrically isolated during the shutdown (i.e., in response to the crash event) and was then subsequently and inadvertently reconnected.

The electrified vehicle 100 comprises an electrified powertrain 108 configured to generate and transfer drive torque to a driveline 112. The electrified powertrain 108 includes one or more electric motors (e.g., one or more three-phase electric traction motors) 116 configured to generate drive torque using electrical energy provided by a high voltage electrical system 120 (e.g., to satisfy a driver torque request provided via a driver interface 156). The high voltage electrical system 120 further comprises a high voltage battery pack or system 124 and a high voltage bus 128 connecting the high voltage battery system 124 to the electric motor(s) 116 with a high voltage contactor 132 therebetween. While not shown, it will be appreciated that the electrified powertrain 108 could include other non-illustrated components, such as a gear reducer or transmission, an internal combustion engine, and a DC-DC converter.

The electrified vehicle 100 also includes a low voltage (e.g., 12 volt, or V) electrical or battery system 136. This low voltage electrical system 136 can be used, for example, to power low voltage components of the electrified vehicle 100, such as one or more controllers 140 in communication via a controller area network (CAN) and each configured to execute a specific set of operations. For simplicity, only one of the controllers ("controller 140") may be referenced herein. For example only, the controller 140 could be a battery pack control module (BPCM) configured to control operation of the high voltage battery system 124. The controller 140 is configured to execute both base software (BSW), which is provided by a vendor/supplier of the controller 140, and ASW, which is provided by the vehicle original equipment manufacturer (OEM). The controller 140 is configured to communicate with (e.g., read/write) an NVM 144 (e.g., an EEPROM), which could be integrated in the controller 140. The controller 140 further includes a RAM mirror 148 and a RAM block 152.

Figure 2:
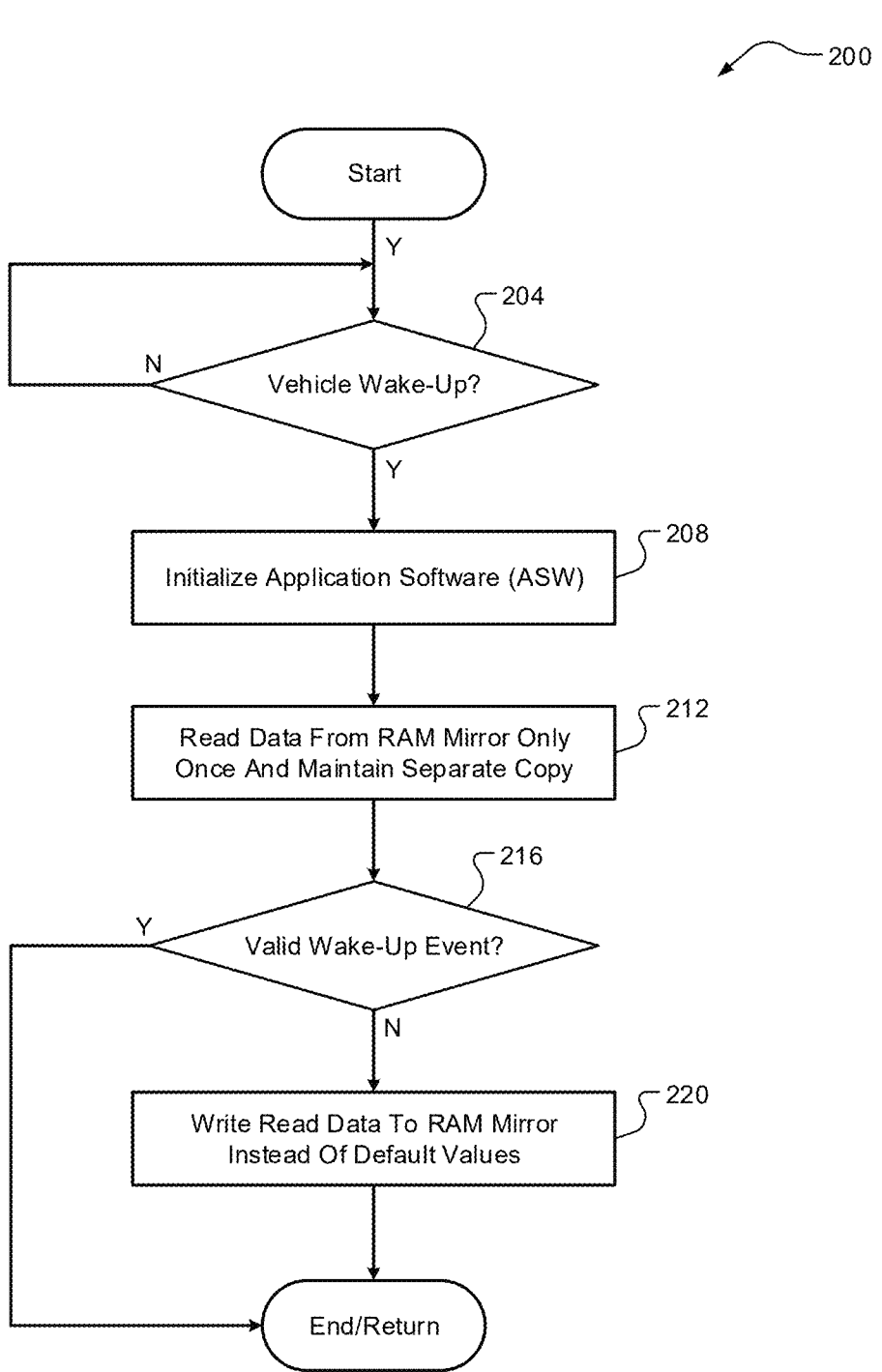
FIG. 2 is a flow diagram of an example NVM initialization control method for an electrified vehicle according to the principles of the present application.

Referring now to FIG. 2, a flow diagram of an example NVM initialization control method for an electrified vehicle according to the principles of the present application is illustrated. While the electrified vehicle 100 and its components are specifically referenced for descriptive/illustrative purposes, it will be appreciated that the method 200 could be applicable to any suitably-configured vehicle. The method 200 begins at 204. At 204, the controller 140 determines whether a vehicle wake-up event is requested or initiated. This could be, for example, in response to a key-on request or in response to 12V power being reconnected. When false, the method 200 ends. When true, the method 200 proceeds to 208. At 208, the controller 140 initializes the RAM mirror 148 from the NVM 144 and via the BSW. In some implementations, the RAM initialization of the RAM mirror 148 from the NVM 144 could be performed via the ASW. At 212, the ASW reads from the RAM Mirror 148 only once during the current power cycle and maintains a separate copy of the read data (e.g., local ASW variables) in another portion of the RAM, such as the RAM block 152. This separate copy of the read data can then be used for subsequent processes in order to not overwrite the data in the RAM mirror 148.

At 216, the controller 140 determines whether the wake-up event is or was a valid wake-up event. This determination is based on whether any intended reason for wake-up exists (a "key-on" event where the customer turned on the ignition, another controller on the CAN requested wake-up, etc.). When true, the method 200 ends or returns to 204. When false, the method 200 proceeds to 220. At 220, the controller 140 writes the read data to the RAM Mirror instead of default values to avoid the problems previously described herein and the method 200 then ends or returns to 204. Examples of the data written to the NVM 144 at vehicle power-down and/or subsequently read from the NVM 144 and stored in the RAM mirror 148 during valid vehicle power-up events include, but are not limited to, HV contactor fault or malfunction information, crash information, battery and vehicle isolation (e.g., electrical isolation) statues), interlock lock status, thermal event fault or malfunction information, battery state of health (SOH) information, and battery state of charge (SOC) information.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A non-volatile memory (NVM) initialization control system for an electrified vehicle, the NVM initialization control system comprising:

an NVM configured to store data relating to operation of the electrified vehicle including information relating to a high voltage battery system of the electrified vehicle; and a controller configured to:

detect a wake-up event of the electrified vehicle;

in response to detecting the wake-up event, execute a base software (BSW) that reads the data from the NVM and writes the data to a random-access memory (RAM) mirror;

read the data from the RAM mirror only once and maintain a separate copy of the read data from the NVM for usage by periodic processes during operation of the electrified vehicle;

determine whether the wake-up event is a valid wake-up event, wherein the valid wake-up event is a power-up of the electrified vehicle that follows a scheduled power-down of the electrified vehicle; and in response to determining that the wake-up event is an invalid wake-up event, execute application software (ASW) configured to write the read data to the RAM mirror instead of default values.

2. The NVM initialization control system of claim 1, wherein the controller is a battery pack control module (BPCM).

3. The NVM initialization control system of claim 1, wherein the RAM mirror is an internal buffer of the controller that is used for read and write operations to the NVM and the separate copy of the read data is stored in a separate RAM block of the controller.

4. The NVM initialization control system of claim 1, wherein the invalid wake-up event is a power-up event of the electrified vehicle that follows an unscheduled power-down of the electrified vehicle.

5. The NVM initialization control system of claim 4, wherein the unscheduled power-down is a 12 volt power loss of the electrified vehicle.

6. The NVM initialization control system of claim 5, wherein the 12 volt power loss of the electrified vehicle is a result of a crash event of the electrified vehicle.

7. The NVM initialization control system of claim 1, wherein the NVM is an electrically-erasable programmable read-only memory (EEPROM).

8. The NVM initialization control system of claim 1, wherein the maintaining of the separate copy of the read data from the NVM for usage by periodic processes during operation of the electrified vehicle and the execution of the ASW configured to write the read data to the RAM mirror instead of default values in response to detecting the invalid wakeup event avoids at least one of (i) false setting of vehicle diagnostics and (ii) improper vehicle functions.

9. A non-volatile memory (NVM) initialization control method for an electrified vehicle, the NVM initialization control method comprising:

providing an NVM configured to store data relating to operation of the electrified vehicle including information relating to a high voltage battery system of the electrified vehicle;

detecting, by a controller, a wake-up event of the electrified vehicle;

in response to detecting the wake-up event, executing, by the controller, a base software (BSW) that reads the data from the NVM and writes the data to a random-access memory (RAM) mirror;

reading, by the controller, the data from the RAM mirror only once and maintain a separate copy of the read data from the NVM for usage by periodic processes during operation of the electrified vehicle;

determining, by the controller, whether the wake-up event is a valid wake-up event, wherein the valid wake-up event is a power-up of the electrified vehicle that follows a scheduled power-down of the electrified vehicle; and in response to determining that the wake-up event is an invalid wake-up event, executing, by the controller, application software (ASW) configured to write the read data to the RAM mirror instead of default values.

10. The NVM initialization control method of claim 9, wherein the controller is a battery pack control module (BPCM).

11. The NVM initialization control method of claim 9, wherein the RAM mirror is an internal buffer of the controller that is used for read and write operations to the NVM and the separate copy of the read data is stored in a separate RAM block of the controller.

12. The NVM initialization control method of claim 9, wherein the invalid wake-up event is a power-up event of the electrified vehicle that follows an unscheduled power-down of the electrified vehicle.

13. The NVM initialization control method of claim 12, wherein the unscheduled power-down is a 12 volt power loss of the electrified vehicle.

14. The NVM initialization control method of claim 13, wherein the 12 volt power loss of the electrified vehicle is a result of a crash event of the electrified vehicle.

15. The NVM initialization control method of claim 9, wherein the NVM is an electrically-erasable programmable read-only memory (EEPROM).

16. The NVM initialization control method of claim 9, wherein the maintaining of the separate copy of the read data from the NVM for usage by periodic processes during operation of the electrified vehicle and the execution of the ASW configured to write the read data to the RAM mirror instead of default values in response to detecting the invalid wakeup event avoids at least one of (i) false setting of vehicle diagnostics and (ii) improper vehicle functions.

* * * * *